United States Patent [19]

Borchardt et al.

[11] Patent Number: 5,272,525
[45] Date of Patent: Dec. 21, 1993

[54] SYSTEM FOR LOCAL WIRELESS TRANSMISSION OF SIGNALS AT FREQUENCIES ABOVE 900 MHZ

[75] Inventors: Robert L. Borchardt, New York; William T. McGreevy, Babylon, both of N.Y.

[73] Assignee: Recoton Corporation, Long Island, N.Y.

[21] Appl. No.: 665,772

[22] Filed: Mar. 7, 1991

[51] Int. Cl.$^5$ ............................................. H04N 5/00
[52] U.S. Cl. ..................... 358/83; 358/186; 358/188
[58] Field of Search ................ 358/83, 186, 188, 254

[56] References Cited

U.S. PATENT DOCUMENTS

| | | |
|---|---|---|
| 2,287,065 | 6/1942 | Roberts . |
| 2,508,853 | 5/1950 | Bond et al. . |
| 2,831,105 | 4/1958 | Parker . |
| 3,697,941 | 10/1972 | Christ . |
| 3,984,625 | 10/1976 | Camras . |
| 4,097,893 | 6/1978 | Camras . |
| 4,145,720 | 3/1979 | Weintraub et al. . |
| 4,259,746 | 3/1981 | Sandstedt . |
| 4,386,436 | 3/1983 | Kocher et al. . |
| 4,392,022 | 7/1983 | Carlson . |
| 4,417,279 | 11/1983 | Shinakawa et al. ............ 358/188 X |
| 4,434,510 | 2/1984 | Lemelson . |
| 4,549,179 | 10/1985 | Stendardo . |
| 4,605,968 | 8/1986 | Hayashi ............................. 358/188 |
| 4,621,374 | 11/1986 | Micic et al. . |
| 4,658,438 | 4/1987 | Kamata et al. ................. 358/188 X |
| 4,685,133 | 8/1987 | Iggulden . |
| 4,694,338 | 9/1987 | Tsinberg . |
| 4,739,413 | 4/1988 | Meyer . |
| 4,771,344 | 9/1988 | Fallacaro et al. . |
| 4,916,532 | 4/1990 | Streck . |
| 4,980,665 | 12/1990 | Schotz . |
| 4,984,296 | 1/1991 | Schotz . |
| 5,047,860 | 9/1991 | Rogalski ........................ 358/186 X |

OTHER PUBLICATIONS

"New 902-928 MHz Band Now Open!", *Spec-Com Journal*, Sep./Oct. 1985, cover page and page 9.
*Federal Register*, vol. 50, Aug. 22, 1985, Final Rulemaking re addition of 902-928 MHz band to Amateur Radio Service Rules, pp. 33937 through 33940.
"Reference Data for Engineers: Radio, Electronics, Computer and Communications", Howard W. Sams & Co., Inc., 7th Edition, 1986, cover page, and pp. 1-5, 1-18 and 35-10 through 35-15.
"TVC-9 GaAs FET 33 cm ATV Downconverter", *Spec-Com Journal*, Sep./Oct. 1986, cover page and pp. 20-21.
Jerry Iggulden, Rule Making Petition to Federal Communications Commission, Sept. 11, 1985.
FCC Public Notice Report No. 1544, Oct. 21, 1985 (two pages) and certification that the same is a true and correct copy.
Hap Griffin, "HAM-TV, Amateur Radio's Visual Mode That Blends, Voice, Video, Photography & Experimentation!", *A5 Amateur Television Magazine*, Sep. 1984, pp. 6-9.
P. C. Electronics, Advertisement, *A5 Amateur Television Magazine*, Sep. 1984, cover/table of contents page and pp. 20-23.
Henry B. Ruh, "All About Amateur TV", *QST Magazine*, Jun. 1981, pp. 11-12.
E. Laird Campbell, "Amateur TV-The Easy Way", *QST Magazine*, Nov. 1962, pp. 33-41 and 150.
1981 Radio Amateur's Handbook, published by the American Radio Relay League, cover page and pp. 14-28 to 14-33.
Fenton, *Radio Electronics*, Nov. 1987, p. 4.

*Primary Examiner*—Mark R. Powell
*Attorney, Agent, or Firm*—Curtis, Morris & Safford

[57] ABSTRACT

A wireless local transmission system includes a separate transmitter and receiver. The transmitter converts an audio signal and/or an audio and video signal into a modulated signal within the 902-928 MHz frequency band and transmits the modulated signal to the receiver which reconverts the modulated signal to a frequency band below 900 MHz for use by a radio or television receiver.

21 Claims, 8 Drawing Sheets

SYSTEM FOR LOCAL WIRELESS TRANSMISSION OF SIGNALS AT FREQUENCIES ABOVE 900 MHZ

BACKGROUND OF THE INVENTION

The present invention relates to a system for local transmission of signals, such as television signals, audio signals, and the like, and more particularly to a wireless local signal transmission system for transmitting signals at frequencies above 900 Mhz.

Audio and television equipment for home use is becoming increasingly complex, involving multiple programming sources. Many homes typically have more than one television and more than one stereophonic audio system in order to provide viewing and listening capability in more than one room in the home. If it is desired to provide viewing and listening capability in more than one room in the home from an exterior antenna or a CATV service it has been necessary heretofore to hardwire television antenna leads, either 300 ohm twin lead or 75 ohm coaxial cable between the source of the signal as it enters the home and each of the receivers at which reception is desired. It has also been necessary to have separate VCRs and video disk players at each location where such programming was desired.

It has recently been proposed to employ local signal transmission systems operating within a frequency band of 902 MHz to 928 MHz for transmitting television signals locally from a programming source to a remote television receiver. See U.S. Pat. No. 4,916,532 issued Apr. 10, 1990.

However, the practical implementation of wireless local signal transmission system operating in the 902 MHz to 928 MHz frequency band is problematical in a number of respects. Transmitter power is limited to 500 microwatts and the transmitter must employ a quarter wave transmitting antenna, so that the signal is transmitted at a very low level, thus severely limiting the local transmission range.

Local transmission receivers heretofore provided for use in the 902 MHz to 928 MHz frequency band exhibit limited selectivity so that it has not been possible to practically transmit and receive a plurality of signals transmitted at different frequencies within the local transmission band. This presents a serious limitation on the usefulness of such local signal transmission systems, as it is not possible to transmit signals from a plurality of sources simultaneously.

OBJECTS AND SUMMARY OF THE INVENTION

It is, therefore, one object of the present invention to overcome the limitations of conventional local transmission systems which operate at frequencies above 900 MHz.

It is another object of the present invention to provide a receiver apparatus for receiving local wireless signal transmissions at frequencies above 900 MHz affording superior signal selectivity thus to provide the ability to conduct simultaneous transmissions at different frequencies.

It is a further object of the present invention to provide a receiver apparatus for receiving local wireless signal transmissions at frequencies above 900 MHz for which a user has the ability to utilize one of a plurality of receiving antenna types.

It is a still further object of the present invention to provide a receiver apparatus for receiving local wireless signal transmissions within a frequency band extending substantially from 902 MHz to 928 MHz, and methods for making such receiver apparatus, which are readily and economically implemented.

In accordance with one aspect of the present invention, a system is provided for wireless transmission of signals at frequencies above 900 MHz comprising transmitter means for transmitting signals at frequencies above 900 MHz, the transmitter means including a transmitting antenna for radiating the signals; and receiver means for receiving the radiated signals, comprising a receiving antenna; amplifier means having an input coupled with the receiving antenna for amplifying the signals at frequencies above 900 MHz to produce amplified signals; the amplifier means having an output for providing the amplified signals; tank circuit means coupled with the output of the amplifier means for selecting frequencies provided at the output which are within a predetermined pass band of the amplified signals for producing tuned signals; downconverter means coupled with the tank circuit means to receive the tuned signals for downconverting the tuned signals to produce downconverted signals within a predetermined frequency band below 900 MHz; and output means for providing the downconverted signals at an output of the receiver means.

In accordance with another aspect of the present invention, a receiver apparatus is provided for receiving local wireless signal transmissions at frequencies above 900 MHz, comprising a receiving antenna; amplifier means for amplifying signals at frequencies above 900 MHz received at an amplifier input thereof to produce amplified signals; the amplifier means having an output for providing the amplified signals; antenna coupling means for coupling the receiving antenna with the amplifier input; tank circuit means coupled with the output of the amplifier means for selecting frequencies provided at the output which are within a predetermined pass band of the amplified signals to thereby produce tuned signals; downconverter means coupled with the tank circuit means to receive the tuned signals for downconverting the tuned signals to thereby produce downconverted signals within a predetermined frequency band below 900 MHz; and output means for providing the downconverted signals at an output of the receiver means.

In accordance with still another aspect of the present invention, a receiver apparatus for receiving local wireless signal transmissions at frequencies above 900 MHz, comprises: a housing; first antenna means for receiving the local wireless signal transmissions; first antenna coupling means supported by the housing for releasably coupling with the first antenna means and releasably supporting the first antenna means; second antenna means for receiving the local wireless signal transmissions; the second antenna means comprising directional antenna means and support means for supporting the directional antenna means in one of a plurality of selectable attitudes; second antenna coupling means supported by the housing for releasably coupling with the second antenna means; receiver means for amplifying the local wireless signal transmissions at frequencies above 900 MH and downconverting the local wireless signal transmissions; the receiver means having a receiver input for receiving the local wireless signal transmissions; and means for coupling at least one of the first and second antenna coupling means with the receiver input.

In accordance with a still further aspect of the present invention a television receiver comprises: means for selectably receiving at least one of a local wireless television transmission at a frequency outside a predetermined television broadcast band and a remote relevision transmission within a television broadcast band channel and converting the selected one of the local wireless television transmission and the remote television transmission to a converted television signal at frequencies within a television intermediate frequency band; and means for producing viewable television images and audible signals in response to the converted television signals.

In accordance with yet another aspect of the present invention, a method of making a receiver apparatus for receiving local wireless signal transmissions at frequencies above 900 MHz and downconverting the local wireless signal transmissions to frequencies below 900 MHz, comprises the steps of: providing a UHF television broadcast band tuner circuit including tuning means for selecting signals for reception within a predetermined one of a plurality of UHF television broadcast channels and converter means for converting the received signals to intermediate frequency signals within a television intermediate frequency band; and modifying a parameter of the tuning means such that the tuning means is operative to select signals for reception within a predetermined band of signal frequencies higher than 900 MHz.

In accordance with a yet still further aspect of the present invention, a receiver apparatus for receiving local wireless signal transmissions at frequencies above 900 MHz and downconverting the local wireless signal transmissions to a band of frequencies less than 900 MHz, comprises: receiving antenna means for receiving the local wireless signal transmissions; television-type tuner means for downconverting the local wireless signal transmissions to a predetermined band of frequencies less than 900 MHz; and an output terminal for providing the downconverted local wireless signal transmissions as an output of the receiver apparatus.

These, as well as further objects, features and advantages of the present invention will be apparent from the following detailed description of certain preferred embodiments thereof, when read in connection with the accompanying drawings.

DETAILED DESCRIPTION OF CERTAIN PREFERRED EMBODIMENTS

Figure 1:
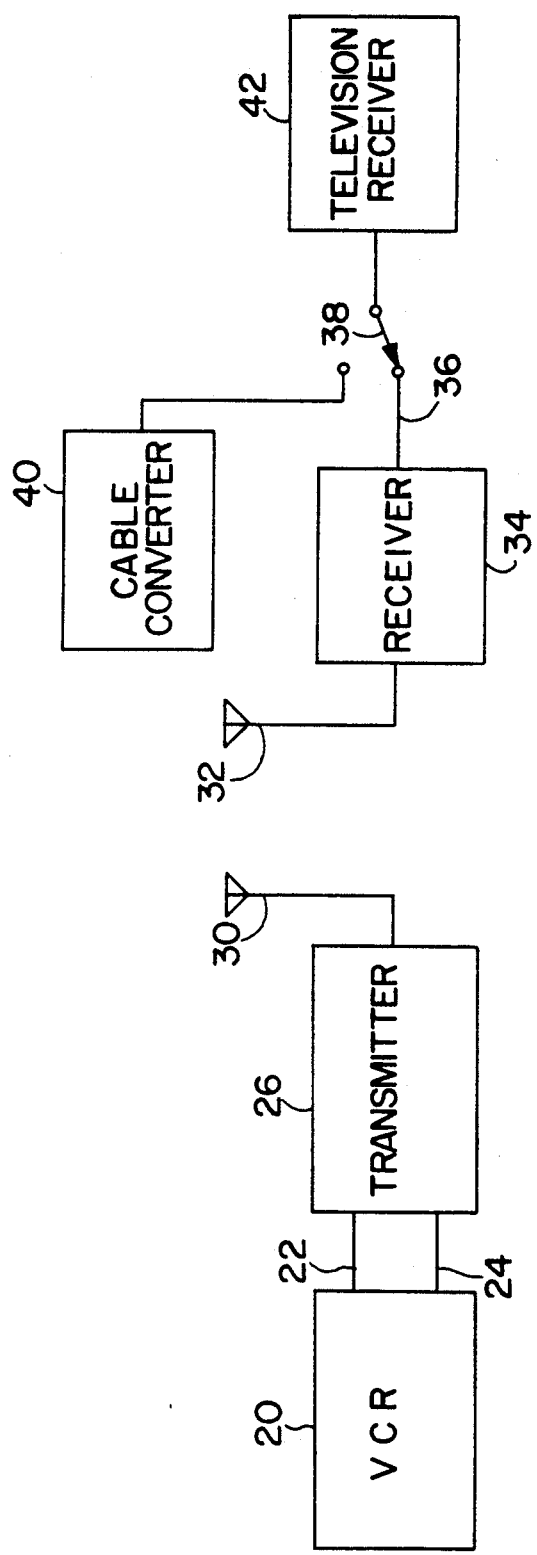
FIG. 1 is a block diagram of a system for wireless transmission of signals at frequencies between 902 MHz and 928 MHz in accordance with one embodiment of the present invention.

With reference first to FIG. 1, a system is illustrated therein for local wireless transmission of television signals within the 902-928 MHz frequency band established for these purposes by the United States Federal Communications Commission. A signal source such as a VCR 20 outputs baseband video signals at a first output 22 and baseband audio signals at a second output 24. It will be appreciated that any other suitable source of video and/or audio signals, such as a video disk player, computer, etc., may replace the VCR 20 in the embodiment of FIG. 1. A transmitter 26 has a first input coupled with the output 22 to receive the baseband video signals and a second input coupled with the output 24 to receive the baseband audio signals and is operative to modulate a selectable carrier thus to produce a modulated carrier having a frequency of either 912 MHz or 922 MHz and output the modulated carrier to a transmitting antenna 30. More specifically, transmitter 26 includes a modulator which is provided with the baseband video and audio signals and serves to selectably produce a conventionally modulated television signal within either television broadcast channel 3 or channel 4, as established by the United States Federal Communications Commission. The conventional television signal in turn modulates the selected carrier to produce the transmitters output signal at either 912 MHz or 922 MHz, as the user selects. It will be appreciated, therefore, that the transmitter 26 is likewise capable of receiving an input signal within either television broadcast channel 3 or channel 4 to directly modulate the carrier. In other words, the transmitter 26 is operative to convert a television signal including audio and video signal components to an upconverted television signal within the 902 MHz-928 MHz local transmission frequency band.

In accordance with regulations of the United States Federal Communications Commission, transmitting antenna 30 is a quarter wave, non-directional transmitting antenna. In addition, the transmitter power is limited to 500 microwatts, also in accordance with such regulations. Such restrictions are intended to limit the radiated power in order to minimize interference between local wireless transmission systems sharing the same transmission frequencies. It will be appreciated, therefore, that the wireless transmission distance is thereby substantially restricted, placing a premium on receiver performance.

A receiving antenna 32 is coupled with an antenna input of a receiver 34. The receiving antenna 32 receives radiated signals from the transmitting antenna 30, providing the same as an input signal to the receiver 34. The receiver 34 is operative to amplify the received signals, select the desired signals within the 902-928

MHz frequency band and downconvert the selected signals selectably either to television broadcast channel 3 or channel 4. The downconverted signals are provided by the receiver 34 at an output terminal 36 thereof coupled with a first fixed input terminal of an A/B switch 38.

A second fixed terminal of the A/B switch 38 is coupled with an output of a cable converter 40, while a moveable terminal of the A/B switch 3 is coupled with the antenna input terminal of a television receiver 42. Accordingly, when the switch 38 is in the position illustrated in FIG. 1, the television receiver is provided with the downconverted signals from the output 36 of the receiver 34, so that the output of the VCR 20 (or an alternative source of programming) is made available for viewing with the use of the television receiver 42 without the need for a hard wired connection therebetween.

In accordance with certain aspects of the present invention, the receiving antenna 32 is mounted on the receiver 34 which is operative to support at least one of two different receiving antennas. In the embodiment described hereinbelow in connection with FIGS. 2-5, a user is afforded the ability to select either a non-directional quarter wave receiving antenna or a directional yagi-type receiving antenna providing additional gain where, for example, there is a relatively large distance between the transmitting antenna and the receiving antenna or the presence of intervening objects, resulting in a low signal level at the receiving antenna. Where, however, the signal level at the position of the receiving antenna is greater, as where the distance between the transmitting and receiving antennas is relatively small and/or objects do not intervene, the user may instead select the non-directional quarter wave receiving antenna which occupies less space and does not require user adjustment as in the case of the directional antenna.

Figure 2:
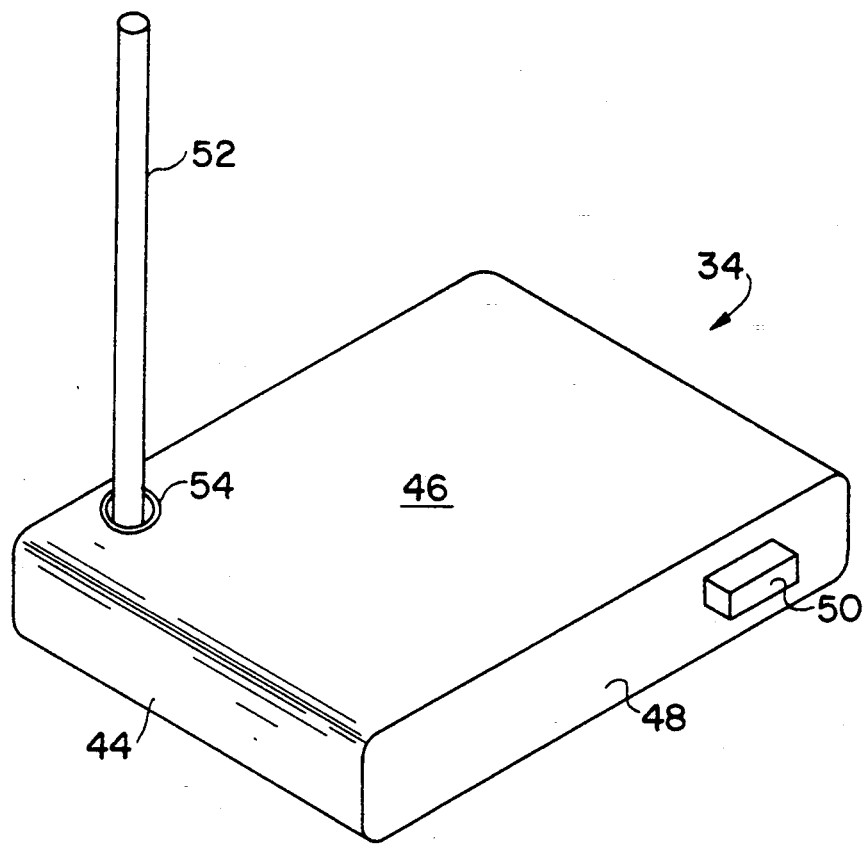
FIG. 2 is a perspective view of a receiver of the embodiment of FIG. 1 employing a quarter wave receiving antenna.

With reference now to FIG. 2, the receiver 34 includes a housing 44 for enclosing the receiver and having an upper surface 46 and a front panel 48. A button of an ON/OFF switch 50 is mounted on the front panel 48. As illustrated in FIG. 2, a quarter wave receiving antenna 52 extends upwardly from within the housing 44 above the upper surface 46 thereof through an aperture in the upper surface 46 ringed by a protective grommet 54.

Figure 3:
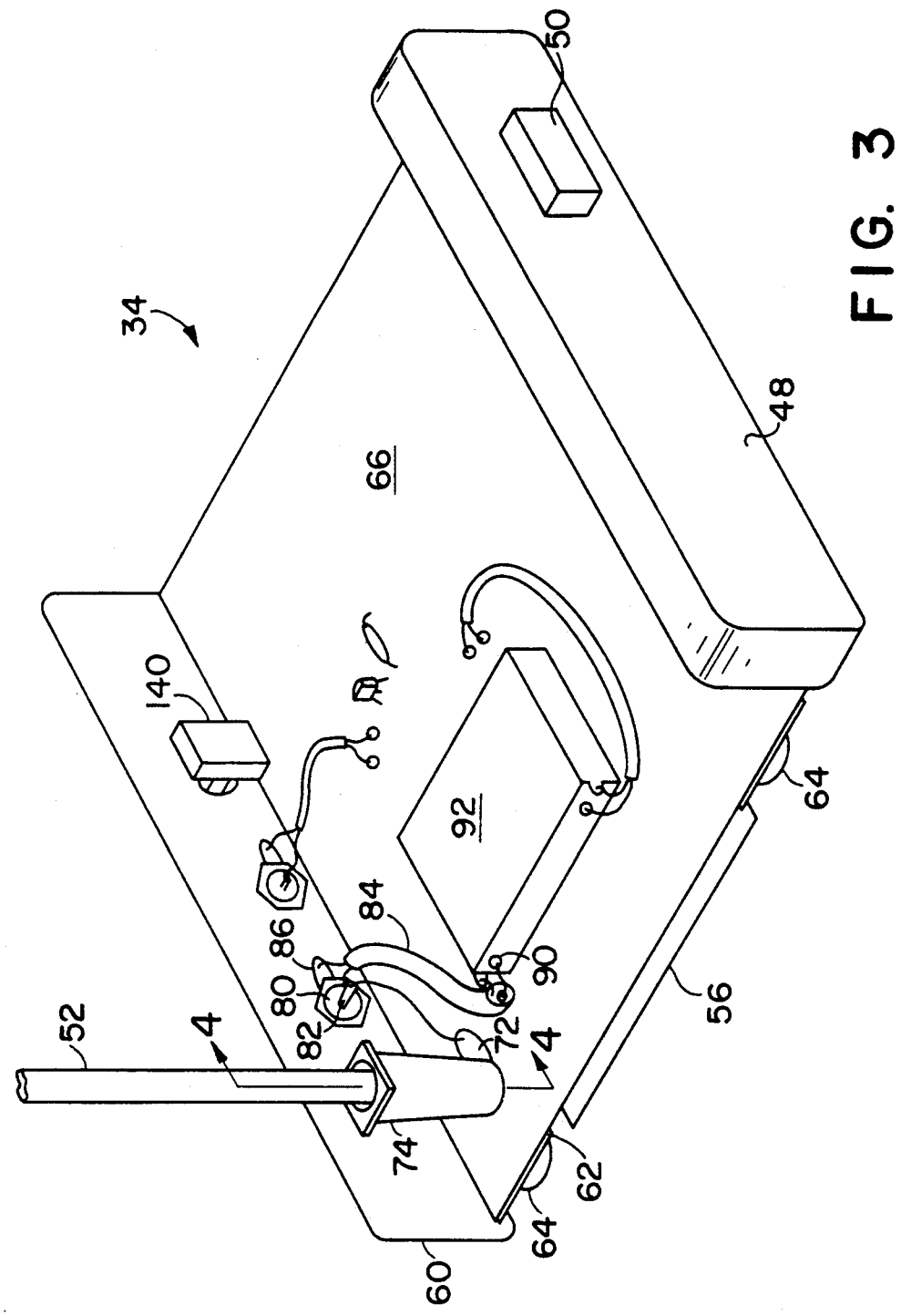
FIG. 3 is a partially broken away perspective view of the receiver of FIG. 2 from which an upper housing member has been removed for illustrating a portion of the interior thereof.

With reference also to FIG. 3, the housing 44 of the receiver 34 is illustrated therein from which an upper housing cover has been removed for illustrating certain internal components of the receiver 34 mounted within the housing. The housing 44 as illustrated in FIG. 3 includes a housing base 56 which includes the front panel 48, a rear panel 60 and a lower member 62 joining the front and rear panels 48 and 60. Four housing feet 64 ar affixed to the lower member 62 for supporting the housing 44 at rest on an object. Portions of two of the housing feet 64 are illustrated in FIG. 3.

The receiver 34 includes a circuit board 66 mounted on the lower member 62 of the housing base 56 and having a number of circuit components and sub-assemblies mounted thereon for interconnection and support. A number of circuit elements have been omitted from FIG. 3 for purposes of simplicity and clarity.

Figure 4:
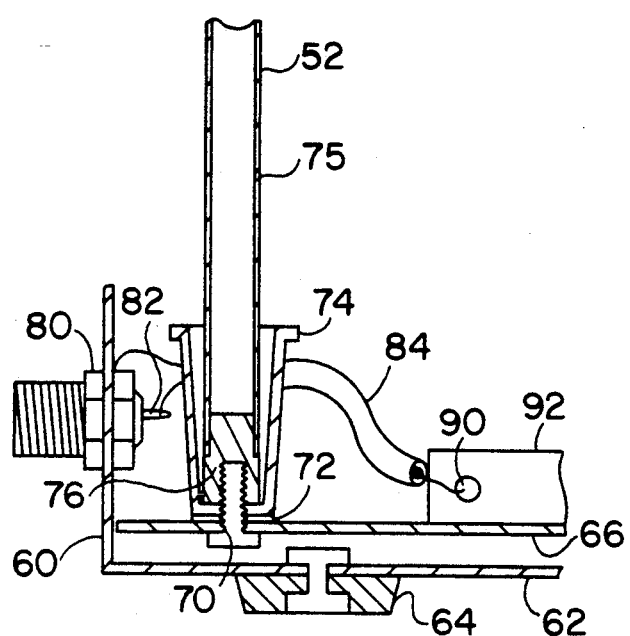
FIG. 4 is a partially broken away, sectional view taken along the lines 4—4 in FIG. 3.

With reference also to FIG. 4, a threaded fastener 70 has a threaded portion extending upwardly through the circuit board 66, through and electrically coupled with a connecting lug 72 and extending into a socket member 74 made of an insulating material, such as a hard plastic material. The socket member 74 has a lower, disc-shaped extremity having a threaded central aperture mated with the threads of the threaded fastener 70 thus to retain the threaded fastener, connecting lug 72 and socket member 74 securely on the circuit board 66, so that the socket member 74 and the threaded fastener 70 are supported indirectly by the lower member 6 of the housing base 56 within the enclosure formed thereby. The socket member 74 also includes an upstanding, generally conically shaped upper portion integrally formed with the lower, disc-shaped portion thereof at a lower extremity of the conically shaped upper portion and extending to an upper extremity forming a generally circular upwardly facing socket aperture aligned with the aperture formed in the upper surface 46 of the housing 44 (refer also to FIG. 2). The threaded fastener 70 is aligned with a central axis of the conically shaped upper portion of the socket member 74.

The quarter wave receiving antenna 52 includes a cylindrical body member 75 and a connector 76 affixed to a lower extremity of the cylindrical body member 75. The connector 76 has a central, downwardly facing aperture formed coaxially with the cylindrical body member 75. The central aperture of the connector 76 is threaded to mate with the threads of the threaded fastener 70 thus to support the quarter wave receiving antenna 52 vertically such that it extends above the upwardly facing surface 46 through the aperture formed therein, while permitting the quarter wave receiving antenna 52 to be readily disengaged from the threaded fastener 70.

By virtue of its connection with the threaded fastener 70, the connecting lug 72 is conductively coupled with the quarter wave receiving antenna 52. A first cable-type connector 80 is mounted on the rear panel 60 of the housing 44 and has an interconnecting lug 82 provided for connecting with the inner conductor of a shielded cable coupled with the connector 80. The interconnecting lug 82 is conductively connected with the connecting lug 72 by a wire and is also connected with the central conductor of a coaxial cable 84. The coaxial cable 84 is provided with an outer, shielding conductor connected with a further connecting lug 86 affixed to an outer conductive portion of the cable-type connector 80 for grounding the outer conductive shield of the coaxial cable 84. An opposing end of the central conductor within the coaxial cable 84 is connected with an input terminal 90 of the receiver 34 coupled with UHF input circuitry thereof enclosed by an RF shield 92. The outer conductive shield of the coaxial cable 84 is conductively coupled with a connecting lug formed on the exterior of the RF shield 92. The RF shield 92, in turn, is mounted on the circuit board 66 for supporting the circuitry enclosed thereby, as well as the input terminal 90, on the circuit board 66. It will be appreciated, therefore, that the quarter wave receiving antenna 52 is thereby conductively coupled through the threaded fastener 70, connecting lug 72, interconnecting lug 82, and coaxial cable 84 with the input terminal 90 of the receiver 34.

Figure 5:
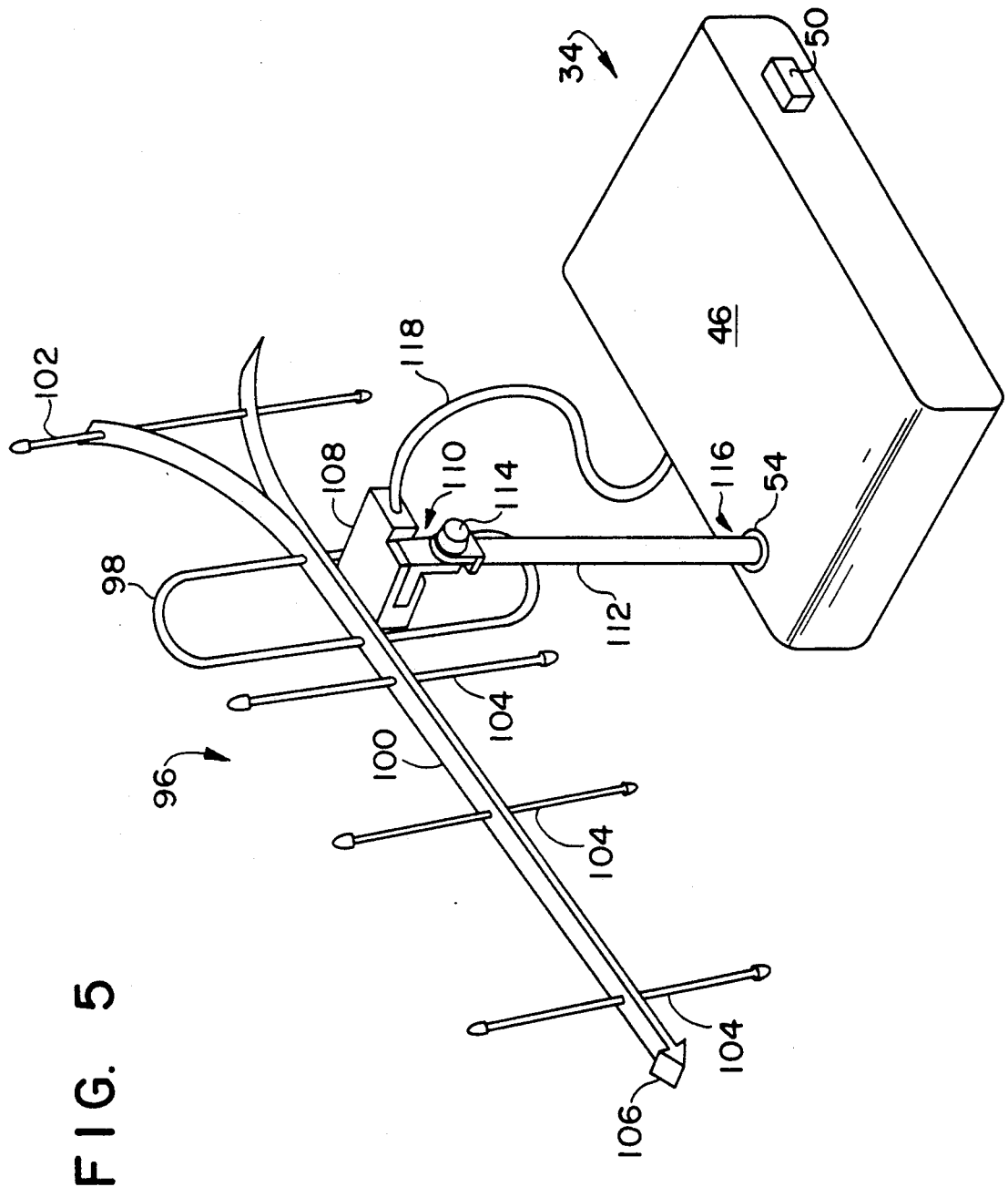
FIG. 5 is a perspective view of the receiver illustrated in FIG. 2 employing a directional yagi-type receiving antenna in place of the quarter wave antenna illustrated in FIG. 2.

Referring also to FIG. 5, the quarter wave receiving antenna 52 illustrated in FIGS. 2-4 has been replaced in FIG. 5 by a directional yagi-type receiving antenna 96. The directional receiving antenna 96 includes an active loop element 98 mounted on an antenna frame member 100, a passive reflector element 102 mounted on the frame member 100, and three passive director elements 104 also mounted on the frame member 100. The elements 98, 102 and 104 are disposed in a common vertical plane and the directional receiving antenna is operative to provide the greatest gain to received signals polarized in such vertical plane and originating from a source to which an arrow 106 formed at a forward extremity of the antenna frame member 100 points.

The antenna frame member 100 is affixed to an antenna base 108 which, in turn, is affixed to a first half of a hinged member 110. A second half of the hinged member 110 is formed by an upper extremity of a vertically extending supporting mast 112. The first and second halves of the hinged member 110 are joined by a horizontally disposed threaded connector 114 extending through an aperture in the second half of the hinged member at the upper extremity of the supporting mast 112 to the first half of the hinged member 110 where the threads of the threaded connector 114 are mated with a threaded aperture provided therein. The threaded connector 114 serves to releasably hold the first and second halves of the hinged member 110 in a predetermined rotational relationship when the threaded connector is tightened thus to enable the user to selectably determine the rotational attitude of the directional receiving antenna 96 in the common vertical plane of the elements 98, 102 and 104. In this fashion, the directional receiving antenna 96 may be pivoted vertically to face in the direction of a signal source emitting a signal polarized in the common vertical plane of the receiving antenna 96, thus to optimize the reception of the signal thereby.

The supporting mast 112 is constructed of an insulating material such as a hard plastic and is provided at a lower extremity thereof, indicated at 116, with a projecting pin configured to fit closely within the socket member 74 such that it is rotatable therein while frictionally resisting such rotation. Since the supporting mast 112 is constructed of an insulating material, it does not load the input 90 of the receiver 34 through the threaded fastener 70. Since the directional receiving antenna 9 is affixed to the supporting mast 112 through the hinged member 110, it will be seen that rotation of the pin 116 in the socket member 74 will thereby effect rotation of the directional receiving antenna 96 horizontally to permit positioning thereof in a horizontal direction for pointing the directional receiving antenna 96 toward a desired signal source. Once the horizontal direction of the antenna 96 is thus selected, the frictional resistance between the projecting pin 116 and the socket member 74 tends to maintain the selected horizontal disposition of the directional receiving antenna 96.

In certain other advantageous embodiments, the supporting mast 112 is mounted apart from the socket member 74. In such embodiments, either separate antenna coupling devices are provided for coupling the respective antennas with the receiver input, or a common coupling device is provided.

A directional antenna coupler is provided in the for of a shielded cable 118 conductively coupled with the active loop element 98 of the antenna 96 through the antenna base 108 which also supplies strain relief for the shielded cable 118 thus to protect the connection thereof with the element 98. The shielded cable 118 is provided with a cable connector at a second extremity thereof (not shown for purposes of simplicity and clarity). With reference also to FIG. 3, the cable connector at the second extremity of the shielded cable is adapted to couple conductively with the cable connector 80 mounted on the rear panel 60 of the housing base 56 thus to electrically connect the active loop element 98 of the antenna 96 with the receiver input terminal 90.

Figure 6:
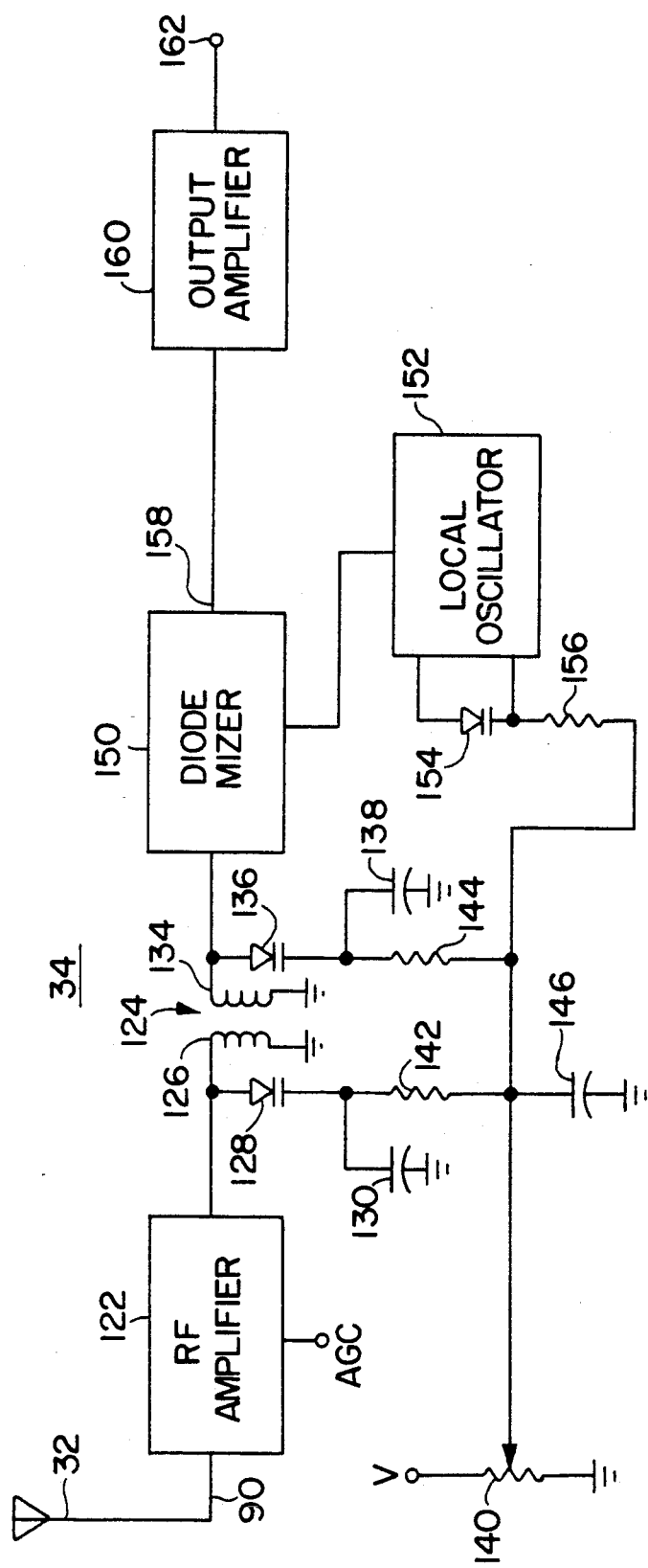
FIG. 6 is a partially block, partially schematic diagram of the receiver illustrated in FIGS. 1-5.

Referring now to FIG. 6, a circuit diagram of the receiver 34 is illustrated therein in which a radio frequency (RF) input amplifier 122 has an input coupled with the input terminal 90 of the receiver 34. Amplifier 122 is a low noise RF amplifier operative to boost the level of the signals received from the antenna 32 and to establish an advantageously high signal-to-noise (S/N) ratio. Amplifier 122 includes an impedance matching network for matching the impedance of the antenna 32 with the input impedance of the amplifier 122. Amplifier 122 has a AGC input for receiving an automatic gain control voltage produced in conventional fashion for adjusting the gain of amplifier 122 in accordance with the level of the received signals.

Amplifier 122 provides the amplified signals at an output thereof coupled with the input of a tunable tank circuit 124 in accordance with one aspect of the present invention, which serves to pass substantially only those of the amplified signals from the amplifier 122 within a selectable one of two predetermined pass bands within the 902-928 MHz local transmission band. In the embodiment of FIGS. 1-6, two such predetermined pass bands are provided, one each centered at 912 MHz and 922 MHz. However, in certain advantageous embodiments of the present invention, three such predetermined pass bands are provided within the 902-928 MHz band. The foregoing capabilities of providing plural pass bands within the 902-928 MHz band are effectively achieved by providing the tunable tank circuit 124 in accordance with the presently described embodiment of the invention. In contrast, local transmission receivers provided by others for use in the 902-928 MHz band have not utilized a tunable tank circuit to achieve signal selectivity and, thus, are practically limited in their ability to select from two or more frequency bands or channels within the 902-928 MHz band.

The tunable tank circuit 124 includes a first inductor 126 coupled in parallel with a first varactor diode 128. A first terminal of the inductor 126 together with the anode of the varactor diode 128 ar connected with the output of the amplifier 122. A second terminal of inductor 126 is connected to ground, while the cathode of the varactor diode 128 is coupled through a first RF bypass capacitor 130 to ground. Capacitor 130 also provides DC blocking to permit the application of a variable DC voltage level to the cathode of the varactor diode 128 for tuning the tank circuit 124, as explained in greater detail hereinbelow.

The first inductor 126 is inductively coupled with a second inductor 134 coupled in parallel with a second varactor diode 136. Accordingly, the anode of the varactor diode 136 is connected with a first terminal of the inductor 134, while a second terminal of the inductor 134 is connected to ground. The cathode of the varactor diode 136 is coupled through a second RF bypass capacitor 138 to ground. Capacitor 138, like capacitor 130, also provides DC blocking, as explained in greater detail hereinbelow.

In order to cause the tunable tank circuit 124 to tune a desired one of a predetermined plurality of pass bands, a selectable voltage level is applied to the cathodes of each of varactor diodes 128 and 136 in order to adjust the capacitance thereof. For the purpose of providing a selectably variable voltage for application to the varactor diodes 128 and 136, a potentiometer 140 is provided having a first fixed terminal provided with a fixed voltage level V and a second fixed terminal connected to ground. A wiper arm of the potentiometer 140 is coupled with the cathodes of each of varactor diodes 128 and 136 through respective fixed resistors 142 and 144. An RF bypass capacitor 146 is connected between the wiper arm of the potentiometer 140 and ground. With reference also to FIG. 3, the potentiometer 140 is illustrated therein mounted on the circuit board 66 adjacent the rear panel 60 having an aperture therein through which a control knob of the potentiometer 140 mechanically coupled with the wiper ar thereof extends to permit the user to adjust the position of the wiper arm thus to tune the tunable tank circuit 124 for selecting a desired channel for reception. It will be appreciated that other equivalent devices may be provided for producing the selectable voltage level at the cathodes of the varactor diodes 128 and 136. For example, a switched network of fixed resistors can be provided in place of the potentiometer 140. In addition, for tuning the tank circuit 124, the values of the inductors 126 and 134 may be varied.

Downconversion of the signals selected with the use of the tunable tank circuit 124 to a desired television broadcast band is achieved by means of a diode mixer 150 which serves to mix the selected signals with a local oscillation voltage produced by a local oscillator 152. The frequency of the local oscillation voltage preferably is maintained at a level higher than that of the selected signals to produce downconverted signals having a frequency determined as the difference between the frequency of the local oscillator voltage and that of the selected signals. In order to cause the frequency of the local oscillation voltage to track changes in the frequencies of the selected signals as the tuning characteristics of the tunable tank circuit 124 are varied, the frequency of the local oscillation voltage is selected by means of a third varactor diode 154 having its cathode coupled through a fixed resistor 156 with the wiper arm of the potentiometer 140. The diode mixer 150 has a first input coupled with the second inductor 134 and the second varactor diode 136 of the tunable tank circuit 124 and a second input thereof is coupled with the local oscillator to receive the local oscillation voltage therefrom. The mixer 150 subjects the downconverted signals to low pass filtering and provides the filtered, downconverted signals at an output 158 thereof. RF amplifier 122, tunable tank circuit 124, diode mixer 150 and local oscillator are enclosed within RF shield 92 illustrated in FIG. 3.

A tuned output amplifier 160 has an input coupled with the output 158 of the mixer 150 and serve both to amplify the downconverted signals and attenuate out-of-band signals which may be present at the output 158. The downconverted signals amplified by the output amplifier 160 are provided thereby to an output terminal 162 of the receiver 34. The antenna input of a conventional television receiver may be coupled with the output terminal 162 and tuned to the broadcast channels of the signals output thereby in order to receive the downconverted signals from the receiver 34.

In accordance with a particularly advantageous method for constructing the receiver 34, a conventional UHF television broadcast band tuner circuit is provided which includes a tuning means for selecting signals for reception within a predetermined one of a plurality of UHF television broadcast channels and converter means for converting the received signals to intermediate frequency signals within a television intermediate frequency band. For example, a Samsung Electro-Mechanics Co., Ltd. Model EBC-7731AL electronic tuner ma be provided for this purpose. The conventional electronic tuner includes an RF input amplifier having an antenna input and an output coupled to a tunable tank circuit which, however, has an upper frequency limit below 900 MHz. The tunable tank circuit includes a first varactor diode coupled in parallel with a first inductor which in turn is inductively coupled with a second inductor coupled in parallel with a second varactor diode. The resonant frequency of the tunable tank circuit is determined by adjusting a voltage level applied to the two varactor diodes. The output of the tunable tank circuit is provided to a diode mixer which serves to mix the signals selected within the UHF television broadcast channels below 900 MHz with a local oscillation voltage produced by a local oscillator in order to downconvert the UHF broadcast channel signals to a television intermediate frequency signal output by the diode mixer. The frequency of the local oscillator is adjusted by means of an adjustable voltage level applied to a varactor diode thereof simultaneously with the application of the variable voltage level to the varactor diodes of the tunable tank circuit. The conventional electronic tuner also includes a television intermediate frequency amplifier which receives the intermediate frequency signal from the diode mixer and serves to both amplify the same and attenuate signals falling outside the television intermediate frequency band.

Further in accordance with the inventive method, a tuning parameter of the tunable tank circuit of the conventional tuner is modified to provide a television-type tuner operative to select signals for reception within the frequency band extending from 902 MHz to 928 MHz. It has been found by the applicant that the tunable tank circuit of the conventional television tuner ma be appropriately modified for this purpose by reducing the inductance of the two inductors of the tunable tank circuit, for example, by separating the terms thereof and by adjusting the voltage levels applied to the two varactor diodes thereof.

In accordance with one embodiment of the inventive method, the frequency of the local oscillation voltage is shifted upwardly so that the difference in frequency between the local oscillation voltage and the signal frequencies of the signals selected by the tunable tank circuits yields signal frequencies of the downconverted signals provided by the diode mixer falling within a predetermined television broadcast band. In addition, the intermediate frequency amplifier is modified to accept frequencies for amplification within the television broadcast band, rather than the intermediate frequency band, by shifting the resonant frequency of tuning circuits included therein and also by broadening the response thereof, for example, by coupling a resistor in parallel thereacross.

In accordance with a further embodiment of the inventive method, a parameter of the frequency converter of the conventional television tuner is modified so that it is operative to downconvert the received signals to a predetermined audio broadcast frequency band. Corresponding modifications are effected in the television intermediate frequency amplifier to accept and amplify signals output by the converter within the predetermined audio broadcast frequency band.

Figure 7:
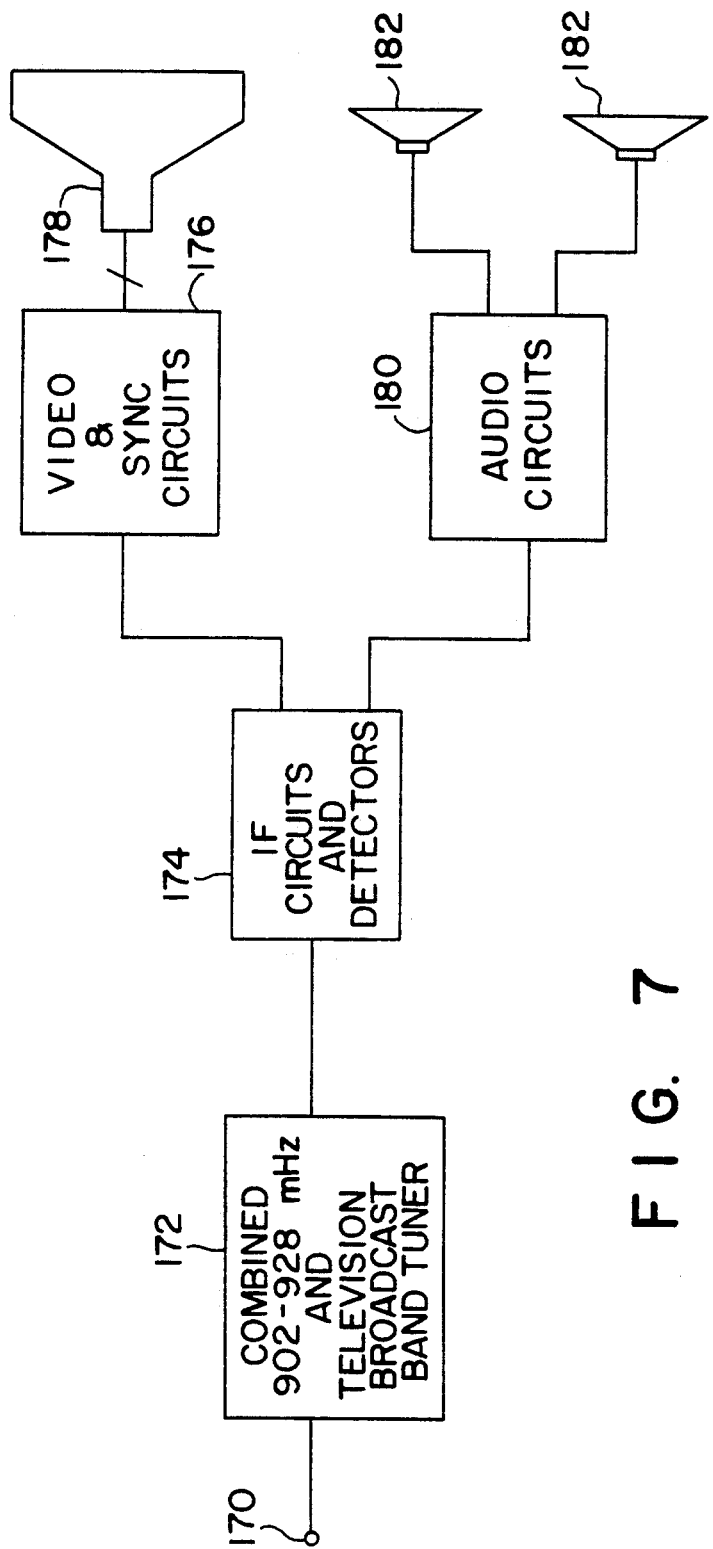
FIG. 7 is a block diagram of a television receiver capable of receiving television broadcast band signals and local wireless transmission within a frequency band of 902 MHz to 928 MHz in accordance with another embodiment of the present invention.

With reference now to FIG. 7, a television receiver in accordance with a further aspect of the present invention is illustrated therein having an antenna input terminal 170 coupled with the input of a combined 902 to 928

MHz tuner and television broadcast band tuner 172. The combined tuner 172 includes a UHF television tuner operative to receive both television broadcast band signals and wireless local transmission signals within the 902 to 928 MHz band. The received signals are downconverted by the combined tuner 172 to a television intermediate frequency band and supplied to the input of conventional television intermediate frequency circuits and detection circuits 174 which serve to amplify the intermediate frequency television signals and demodulate the audio and video signals included therein. The demodulated video signals ar supplied to conventional video and synchronization circuits 176 operative to produce a plurality of output signals for application to a conventional television picture tube 178. The demodulated audio signals produced by the intermediate frequency circuits 174 are supplied to the input of conventional audio frequency circuits 180 which serve to amplify the audio frequency signals and supply the same either as monaural or stereo audio signals to a pair of speakers 182.

Figure 8:
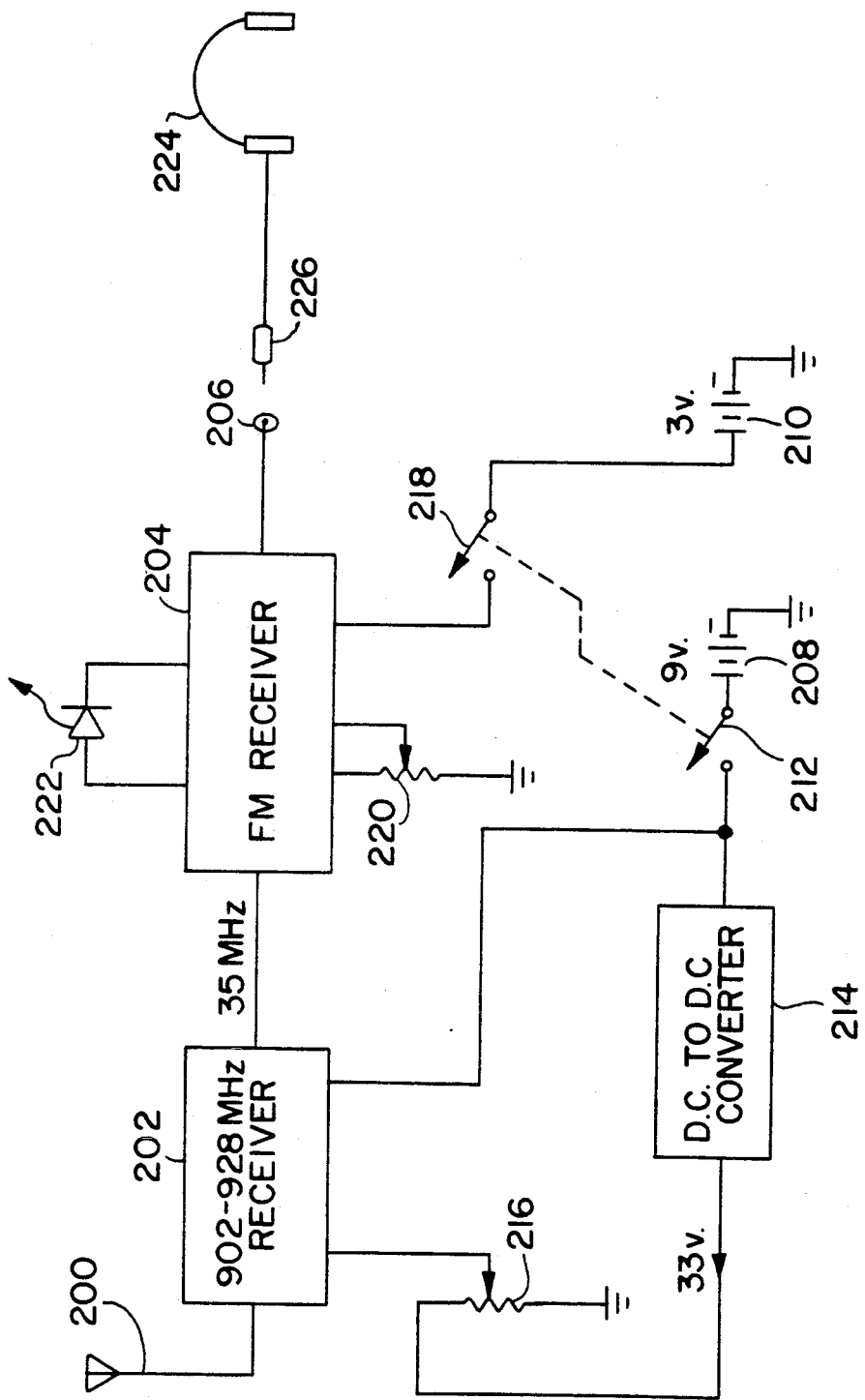
FIG. 8 is a partially block, partially schematic diagram of a stereophonic FM audio receiver for receiving high fidelity audio signals from a local wireless FM audio transmitter at a frequency within the 902 MHz to 928 MHz frequency band.

With reference now to FIG. 8, a portable audio FM receiver for receiving local wireless transmissions of audio signals at frequencies above 900 MHz is illustrated therein. The receiver includes a receiving antenna 200 coupled with the input of a 902 to 928 MHz receiver 202 of the type disclosed hereinabove which is operative to produce downconverted output signals at a frequency of 35 MHz at an output terminal thereof. The output terminal of the receiver 202 is coupled with an input of an FM audio receiver 204 which is tuned to 35 MHz and is operative to decode and output stereo audio signals which it provides at an output thereof coupled with a stereo headphone jack 206. A nine volt battery 208 and a three volt battery 210 comprise a portable power source for operating the circuits illustrated in FIG. 8. A negative terminal of the nine volt battery 208 is coupled with ground and the positive terminal thereof is coupled with a first pole 212 of an ON/OFF switch. When the ON/OFF switch is in the ON position the positive terminal of the nine volt battery is coupled both with a power input terminal of the receiver 202 and with an input of a D.C. to D.C. converter 214. The D.C. to D.C. converter 214 is operative to convert the nine volt input to a thirty-three volt output which is coupled with a first fixed terminal of a potentiometer 216. A second fixed terminal of the potentiometer 216 is connected with ground, while a wiper arm thereof is coupled with a tuning voltage input of the receiver 202. Potentiometer 216 together with D.C. to D.C. converter 214 act as a selectably variable voltage source for tuning the receiver 202 in order to select from one or more audio signals wirelessly transmitted within the 902-928 MHz band.

A negative terminal of the three volt battery 210 is connected with ground and the positive terminal thereof is connected with a second pole 218 of the ON/OFF switch which is operative in the ON position to supply power to the FM audio receiver 204. Poles 212 and 218 of the ON/OFF switch are ganged for operation in tandem. The FM audio receiver 204 is provided with a volume control in the form of a potentiometer 220 and a light emitting diode 222 for indicating the proper reception of a stereo audio signal by the FM audio receiver 204. The circuit of FIG. 8 preferably is enclosed within a portable carrying case which may be carried by a user for private listening with the use of a pair of stereo headphones, such as headphone 224 having a headphone plug 226 adapted to mate with the stereo headphone jack 206. In an alternative embodiment, the circuit of FIG. 8 is coupled with either one or a pair of remotely located speakers to receive locally transmitted audio signals from a source, such as a home high fidelity system located elsewhere in a house, to provide to the speaker or speakers.

With the use of the circuit of FIG. 8, a listener is able to receive, for example, high fidelity audio signals from a permanently located source, such as compact disc player, without the need for a hardwired connection thereto.

It will be appreciated that the receiver of the present invention, by providing the ability to select from two or more frequency bands within the 902-928 MHz band, has widespread application where the need for local signal transmission exists. For example, a pair of differently tuned transmitters each transmitting a different television signal may be selected for viewing at a nearby location without the need for a hardwired connection to such programming source. In addition, where it is desired to provide a security system having more than one surveillance camera located on a given premises, each camera may be provided with a corresponding transmitter transmitting over a respectively different frequency band within the 902-928 band MHz local wireless transmission band. It will also be appreciated that the system of the present invention may be employed for transmitting digital data, for example, for implementing a computerized security system.

The above description of the invention is intended to be illustrative and not limiting. Various changes or modifications in the embodiments described may occur to those skilled in the art and these can be made without departing from the spirit or the scope of the invention.

What is claimed is:

1. A receiver apparatus for receiving local wireless signal transmissions at frequencies above 900 MHz, comprising: a receiving antenna; amplifier means for amplifying signals at frequencies above 900 MHz received at an amplifier input thereof to produce amplified signals, said amplifier means having an output for providing said amplified signals; antenna coupling means for coupling said receiving antenna with said amplifier input; tunable tank circuit means coupled with the output of said amplifier means for passing amplified signals within a selectable one of a plurality of predetermined pass bands above 900 MHz to thereby produce tuned signals, said tunable tank circuit means comprising a first inductor coupled in parallel with a first varactor diode, said first inductor and said first varactor diode being coupled with the output of said amplifier means to receive the amplified signals, said tunable tank circuit means further comprising a second inductor coupled in parallel with a second varactor diode, said second inductor being inductively coupled with said first inductor, and tuning selector means operative to apply selectively variable voltages across said first and second varactor diodes; downconverter means coupled with said second inductor and said second varactor diode to receive the tuned signals for downconverting the tuned signals to thereby produce downconverted signals within a predetermined frequency band below 900 MHz; and output means for providing said downconverted signals at an output of said receiver means.

2. A receiver apparatus for receiving local wireless signal transmissions at frequencies above 900 MHz, comprising: a receiving antenna; amplifier means for amplifying signals at frequencies above 900 MHz received at an amplifier input thereof to produce amplified signals; said amplifier means having an output for providing said amplified signals; antenna coupling means for coupling said receiving antenna with said amplifier input; tunable tank circuit means for passing amplified signals within a selectable one of a plurality of predetermined pass bands above 900 MHz to thereby produce tuned signals, the tunable tank circuit means comprising a first inductor coupled in parallel with a first varactor diode, said first inductor and said first varactor diode being coupled with the output of said amplifier means to receive the amplified signals, and tuning selector means for applying a selectively variable voltage across said first varactor diode, downconverter means coupled with said tank circuit means to receive said tuned signals for downconverting said tuned signals to thereby produce downconverted signals within a predetermined frequency band below 900 MHz, said downconverter means comprising local oscillator means for producing a local oscillation voltage at a predetermined frequency, said local oscillator means including a second varactor diode operative to adjust the predetermined frequency of the local oscillator voltage in accordance with a tuning voltage applied thereacross, and mixing means having a first input coupled with said tank circuit means to receive said tuned signals and a second input coupled with said local oscillator means to receive said local oscillation voltage therefrom for producing the downconverted signals at frequencies determined by the difference in frequency between sad tuned signals and said local oscillation voltage, said tuning selector means being operative to apply the tuning voltage across said second varactor diode such that the frequency of said local oscillation voltage is selected to maintain the frequencies of the downconverted signals within said predetermined frequency band below 900 MHz; and output means for providing said downconverted signals at an output of said receiver means.

3. The receiver apparatus of claim 2, wherein said mixing means comprises diode mixing means.

4. The receiver apparatus of claim 2, wherein said tuning selector means is operative to apply the tuning voltage across said second varactor diode such that the frequency of said oscillation voltage is selected to maintain the frequencies of the downconverted signals within a predetermined television band less than 900 MHz.

5. A receiver apparatus for receiving local wireless signal transmissions at frequencies above 900 MHz, comprising: a receiving antenna; amplifier means for amplifying signals at frequencies above 900 MHz received at an amplifier input thereof to produce amplified signals; said amplifier means having an output for providing said amplified signals; antenna coupling means for coupling said receiving antenna with said amplifier input; tank circuit means for selecting frequencies provided at the output of said amplifier means which are within a predetermined pass band of said amplified signals to thereby produce tuned signals, said tank circuit means comprising a first inductor coupled in parallel with a first varactor diode, said first inductor and said first varactor diode being coupled with the output of said amplifier means to receive the amplified signals, said tank circuit means further comprising a second inductor coupled with a second varactor diode, said second inductor being inductively coupled with said first inductor; downconverter means coupled with said second inductor and said second varactor diode to receive said tuned signals for downconverting said tuned signals to thereby produce downconverted signals within a predetermined frequency band below 900 MHz; and output means for providing said downconverted signals at an output of said receiver means.

6. A receiver apparatus for receiving local wireless signal transmissions at frequencies above 900 MHz, comprising: a housing including an enclosure and a base for supporting said housing at rest on an object, the enclosure having an upwardly facing surface; a quarter wave receiving antenna having a first antenna coupler at an extremity thereof; receiver means for amplifying a signal having a frequency greater than 900 MHz and downconverting said signal to frequencies less than 900 MHz, said receiver means having a receiver input for receiving said signal; said receiver means being supported within said enclosure; a first antenna coupling means for releasably coupling with said first antenna coupler of said quarter wave receiving antenna and supporting said quarter wave receiving antenna vertically above the upwardly facing surface of said enclosure, said first antenna coupling means including a socket supported by said housing; said first antenna coupling means including means for coupling said first antenna coupler with said receiver input; a directional receiving antenna having a directional antenna coupler; a supporting mast having a mounting member configured to fit within the socket of said first antenna coupler for supporting said supporting mast above the upwardly facing surface of said enclosure; said supporting mast including means for rotationally supporting said directional receiving antenna thereon such that said directional receiving antenna may be rotated to face towards a source of said local wireless signal transmissions for optimizing the reception thereof; and a second antenna coupling means for coupling with said directional antenna coupler; said second antenna coupling means being supported by said housing and including means for coupling said directional antenna coupler with said receiver input.

7. The receiver apparatus of claim 6, wherein the mounting member of said supporting mast is configured to mount rotationally within the socket of said first antenna coupler such that said supporting mast and said directional receiving antenna are rotationally mounted on said housing;

8. The receiver apparatus of claim 7, wherein the mounting member comprises a projecting pin having an outer surface configured to fit closely within said socket such that the outer surface of said projecting pin produces frictional resistance to rotation thereof in said socket for maintaining a selected rotational attitude of said supporting mast with respect to said housing.

9. The receiver apparatus of claim 7, wherein said socket is positioned with respect to said housing to mount said supporting mast vertically such that a horizontal direction of said directional antenna may be selected by rotating said supporting mast in said socket.

10. The receiver apparatus of claim 9, wherein said means for rotationally supporting said directional receiving antenna on said supporting mast is operative to rotate said directional receiving antenna in a vertical plane and includes means for releasably fixing said directional receiving antenna in a selected rotational position in said vertical plane.

11. The receiver apparatus of claim 6, wherein said first antenna coupling means is mounted within said enclosure.

12. The receiver apparatus of claim 11, further comprising a circuit board mounted on said housing within said enclosure, said first antenna coupling means being mounted on said circuit board, at least a portion of said receiver means including said receiver input terminal being mounted on said circuit board.

13. The receiver apparatus of claim 6, wherein said first antenna coupler includes a first threaded connector and said first antenna coupling means includes a second threaded connector configured to mate with said first threaded connector to effect an electrical connection therewith.

14. The receiver apparatus of claim 13, wherein the socket of said first antenna coupling means is mounted within said enclosure and is disposed to receive the mounting member of said supporting mast vertically therein, said socket having a central axis, said second threaded connector being positioned on the central axis of said socket such that the first antenna coupler of said quarter wave receiving antenna is positioned within said socket for mating the first threaded connector with the second threaded connector, the second threaded connector being disposed to support said quarter wave receiving antenna vertically above the upwardly facing surface of the enclosure.

15. The receiver apparatus of claim 6, wherein said means for coupling said first antenna coupler with said receiver input forms an electrical connection between said first antenna coupler and said receiver input.

16. The receiver apparatus of claim 6, wherein said means for coupling said directional antenna coupler with said receiver input forms an electrical connection between said directional antenna coupler and said receiver input.

17. A receiver apparatus for receiving local wireless signal transmissions at frequencies above 900 MHz, comprising: a housing; first antenna means for receiving said local wireless signal transmissions; first antenna coupling means supported by said housing for releasably coupling with said first antenna means and releasably supporting said first antenna means; second antenna means for receiving said local wireless signal transmissions; said second antenna means comprising directional antenna means and support means for supporting said directional antenna means in one of a plurality of selectable attitudes; second antenna coupling means supported by said housing for releasably coupling with said second antenna means; receiver means for amplifying said local wireless signal transmissions at frequencies above 900 MHz and downconverting said local wireless signal transmissions; said receiver means having a receiver input for receiving said local wireless signal transmissions; and means for coupling at least one of said first and second antenna coupling means with said receiver input.

18. The receiver apparatus of claim 17, wherein said housing includes an enclosure having an upwardly facing surface, and said first antenna coupling means is operative to support said first antenna means above the upwardly facing surface of said enclosure.

19. The receiver apparatus of claim 18, wherein said first antenna means comprises a quarter wave receiving antenna having first and second extremities and a first antenna coupler at the first extremity thereof and wherein said first antenna coupling means is operative to releasably couple with said first antenna coupler to thereby support said first antenna means above the upwardly facing surface of said enclosure.

20. The receiver of claim 17, wherein said housing includes an enclosure having an upwardly facing surface, said first antenna coupling means includes a socket supported by said housing and having an open socket extremity facing upwardly, and wherein said support means includes a supporting mast having a mounting member configured to fit within said socket such that said supporting mast extends upwardly therefrom above the upwardly facing surface of said enclosure to support said directional antenna means above said surface.

21. The receiver of claim 20, wherein said support means includes means for rotationally supporting said directional antenna means for positioning said directional antenna means in said one of a plurality of selectable attitudes.

* * * * *

UNITED STATES PATENT AND TRADEMARK OFFICE
CERTIFICATE OF CORRECTION

PATENT NO. : 5,272,525

DATED : December 21, 1993

INVENTOR(S) : Robert L. Borchardt, et al

It is certified that error appears in the above-identified patent and that said Letters Patent is hereby corrected as shown below:

Please change the title to read : --FM WIRELESS TRANSMISSION SYSTEM WITH TANK CIRCUIT TUNING IN WIRELESS PORTABLE SPEAKERS--

Signed and Sealed this

Twenty-seventh Day of January, 1998

*Attest:*

BRUCE LEHMAN

*Attesting Officer*  *Commissioner of Patents and Trademarks*